US012418350B2

(12) United States Patent
Messié et al.

(10) Patent No.: US 12,418,350 B2
(45) Date of Patent: Sep. 16, 2025

(54) METHOD FOR SYNCHRONIZING A PLURALITY OF COMMUNICATION SERVERS, AND CORRESPONDING COMPUTER DEVICES AND PROGRAMS

(71) Applicant: ORANGE, Issy-les-Moulineaux (FR)

(72) Inventors: Vincent Messié, Chatillon (FR); Benoît Radier, Chatillon (FR); Arnaud Braud, Chatillon (FR); Gaël Fromentoux, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 274 days.

(21) Appl. No.: 18/246,958

(22) PCT Filed: Sep. 24, 2021

(86) PCT No.: PCT/FR2021/051642
§ 371 (c)(1),
(2) Date: Mar. 28, 2023

(87) PCT Pub. No.: WO2022/069818
PCT Pub. Date: Apr. 7, 2022

(65) Prior Publication Data
US 2023/0388035 A1 Nov. 30, 2023

(30) Foreign Application Priority Data
Sep. 29, 2020 (FR) ...................................... 2009880

(51) Int. Cl.
*H04J 3/06* (2006.01)
*H04L 9/40* (2022.01)

(52) U.S. Cl.
CPC .......... *H04J 3/0667* (2013.01); *H04L 63/123* (2013.01)

(58) Field of Classification Search
CPC .............................. H04J 3/0667; H04L 63/123
(Continued)

(56) References Cited

U.S. PATENT DOCUMENTS 7,668,151 B2 * 2/2010 Ryu ...................... H04J 3/0667
370/503
8,392,709 B1  3/2013 Agrawal
(Continued)

FOREIGN PATENT DOCUMENTS

WO  WO-2018057322 A1 *  3/2018  ............. G06F 21/64

OTHER PUBLICATIONS

English translation of the Written Opinion of the International Searching Authority dated Feb. 2, 2022 for corresponding International Application No. PCT/FR2021/051642, filed Sep. 24, 2021.
(Continued)

*Primary Examiner* — Lan Dai T Truong
(74) *Attorney, Agent, or Firm* — David D. Brush; Westman, Champlin & Koehler, P.A.

(57) ABSTRACT

A method for synchronizing a plurality of servers of a communication network, which are capable of exchanging time-stamped data using a time reference. The method is implemented by a primary server of the plurality and includes: transmitting to the other servers, called secondary servers, an initialization message containing an identifier of the primary server, a data item resulting from execution of an algorithm for selecting the primary server from the plurality of servers, and a piece of transmission time information on the initialization message; receiving from at least one secondary server a message acknowledging the transmitted initialization message; and validating a synchronization challenge comprising a difference between a recorded transmission time reference and the piece of transmission time information on the initialization message. The piece of transmission time information replaces the recorded time reference for the time-stamping of the data exchanged between the servers once the validation is complete.

14 Claims, 5 Drawing Sheets

(58) Field of Classification Search
USPC .......................................................... 726/4
See application file for complete search history.

(56) References Cited

U.S. PATENT DOCUMENTS

| | | | |
|---|---|---|---|
| 9,094,142 B2 | 7/2015 | Ruffini et al. | |
| 11,197,075 B1* | 12/2021 | Kamen | H04L 43/0817 |
| 11,483,085 B1* | 10/2022 | Pogue | H04J 3/0667 |
| 2014/0281037 A1 | 9/2014 | Spada et al. | |
| 2018/0349458 A1* | 12/2018 | Guirguis | G06F 16/273 |
| 2024/0140254 A1* | 5/2024 | Xhafa | B60L 53/66 |

OTHER PUBLICATIONS

International Search Report dated Feb. 2, 2022 for corresponding International Application No. PCT/FR2021/051642, filed Sep. 24, 2021.

Written Opinion of the International Searching Authority dated Feb. 2, 2022 for corresponding International Application No. PCT/FR2021/051642, filed Sep. 24, 2021.

D. Mills et al., "Network Time Protocol Version 4: Protocol and Algorithms Specification," Internet Engineering Task Force, Request for Comments: 5905, Category: Standards Track, ISSN: 2070-1721, Jun. 2010.

"IEEE Standard for a Precision Clock Synchronization Protocol for Networked Measurement and Control Systems," PTP (Precision Time Protocol—1588-2008), Sep. 12, 2002.

T. Mizrahi et al., "Security Requirements of Time Protocols in Packet Switched Networks," Internet Engineering Task Force (IETF), Request for Comments: 7384, Category: Informational, ISSN: 2070-1721, Oct. 2014.

J-C Tournier et al., "Strategies to secure the IEEE 1588 protocol in digital substation automation", Critical Infrastructures, 2009. CRIS 2009. Fourth International Conference on, IEEE, Piscataway, NJ, USA, Mar. 27, 2009 (Mar. 27, 2009), p. 1-8, XP031472841.

* cited by examiner

METHOD FOR SYNCHRONIZING A PLURALITY OF COMMUNICATION SERVERS, AND CORRESPONDING COMPUTER DEVICES AND PROGRAMS

CROSS-REFERENCE TO RELATED APPLICATIONS

This Application is a Section 371 National Stage Application of International Application No. PCT/FR2021/051642, filed Sep. 24, 2021, which is incorporated by reference in its entirety and published as WO 2022/069818 A1 on Apr. 7, 2022, not in English.

1. TECHNICAL FIELD

The invention is implemented in a virtual data-space, for example, implemented by a plurality of partners, deployed on a communication infrastructure. The invention relates to the time synchronization of the communication servers involved in the preparation and processing of the data.

2. PRIOR ART

The telecommunications sector is at the heart of a digital transformation that relies on emergent technologies such as Virtual Network Functions (VNF), involving decoupling the network functions from the dedicated physical equipment in order to deploy the network functions in storage spaces, or a cloud, that are more or less distributed and by relying on generic servers.

This evolution of the telecommunication networks also relies on emergent technologies, particularly based on distributed registers and on recording data in these registers without having to use a certification authority. Thus, the various transactions are recorded in registers that are distributed by specific functions, called miners, with enough capacity to solve an enigma and thus obtain the authorization to record the transactions in the registers.

Exchanging and processing data within the virtual data-space requires timestamping. Indeed, in order to classify, to authenticate or more generally to comply with a security level for the exchanged data, time information needs to be added to the data exchanged between the communication servers, also called connectors, of a virtual data-space. However, in order for the time information to be used by the various entities involved in the virtual data-space, the function for timestamping data used by each connector to add the time information to the data should rely on a clock that is shared between the various connectors. Indeed, the various connectors need to use the same time reference so that the timestamping information added by each connector can be used by the other connectors or by other entities of the virtual data-space.

Therefore, a connector must comprise a local clock in order to be able to effectively add timestamping information to the data exchanged in a virtual data-space.

According to the prior techniques, the local clock used by each connector is, for example, synchronized on a more accurate external clock, such as a GNSS (Global Navigation Satellite System) satellite or even a time server. To date, a plurality of protocols exists, including:

NTP (Network Time Protocol—IETF RFC5905—D. Mills et al.,—Network Time Protocol version 4: Protocol and Algorithms Specification);

PTP (Precision Time Protocol—1588-2008—IEEE Standard for a Precision Clock Synchronization Protocol for Networked Measurement and Control Systems);

Timesync—S. Ruffini and B. Giulio. Methods of time synchronization in communication networks—U.S. Pat. No. 9,094,142, Jul. 28, 2015.

These protocols and techniques used in the virtual data-spaces, according to the techniques from the prior art, involve using a single time reference for all the connectors. Firstly, in a virtual data-space context where the connectors are possibly administered by separate entities, it is possible for various sources or references to be used by the various connectors, which implies that the solution based on a single time reference is not adapted to the context of use in a multiple participant virtual data-space. It should be noted that even in a single participant virtual data-space, it can be architecturally difficult to refer to a single time source. Furthermore, this solution is not satisfactory because if the single reference is faulty or even compromised, then the synchronization by a single reference is not completely satisfactory. Moreover, in the event of an attack on or a malfunction of the reference clock, also called master clock, then the synchronization of the connectors and therefore of the data exchanged between the connectors at best proves to be inaccurate and at worst to be inoperative. It should be noted that within a multiple participant context, in particular, it is possible to implement security mechanisms such as those specified in document IETF RFC 7384 (T Mizrahi.—Security Requirements of Time Protocols in Packet Switched Networks), but these mechanisms require the installation of a mediator based on trusted third parties, which can be costly to implement and which is based on a trusted entity, and which can prove to be complex to implement between various participants. Furthermore, the use of a trusted entity represents a safety-critical component.

The subject matter of the present invention is to provide improvements relative to the prior art.

3. DISCLOSURE OF THE INVENTION

The invention aims to improve the situation using a method for synchronizing a plurality of communication servers of a communication network, which servers are capable of exchanging timestamped data using a time reference, said method being implemented by a server, called primary server, of the plurality of servers and comprising:

transmitting an initialization message to the other communication servers, called secondary servers, of the plurality of servers, said initialization message comprising an identifier of the primary server, a data item resulting from the execution of an algorithm for selecting the primary server from among the servers of the plurality of servers, an item of transmission time information of the initialization message;

receiving, from at least one secondary server, an acknowledgement message for the transmitted initialization message;

validating a synchronization challenge comprising the difference between a recorded transmission time reference and the transmission time information of the initialization message, the transmission time information replacing the recorded time reference for timestamping the data exchanged between the servers of the plurality of servers after the validation.

The synchronization by one of the communication servers, also called connectors, in a communication network, such as a virtual data-space, is implemented following the process of selecting a server, called primary server, from among the servers of the data center. By transmitting an initialization message comprising a data item resulting from the execution of a selection algorithm, the other servers of the communication network, also called secondary servers, can thus verify that the server transmitting the initialization message is indeed authorized to transmit time information. Indeed, a plurality of servers of the data-space executes the selection algorithm, and one of them executes faster or is the only one to be able to execute the algorithm and for a given period becomes the reference server for determining the clock used for timestamping the data exchanged between the various connectors in the communication network. The transmission time information corresponding to the moment when the initialization message is effectively transmitted to the other connectors is then used by the other connectors to verify that the time information can effectively be used as a synchronization reference. The reception of an acknowledgement message makes it possible, on the one hand, to verify the identity of the secondary connector transmitting the acknowledgement message and, on the other hand, to determine that the transmission time information has been validated by the secondary connector. Incidentally, non-reception of such a message originating from a secondary server indicates that the secondary server does not validate the transmitted time information. Validating and recording the synchronization challenge comprising the transmission time information allows the synchronization information to be recovered during a future analysis of the data exchanged between the connectors. The timing of the exchanges between the connectors, as well as the periods of validity of security keys, for example, are relevant with respect to an item of time information that can be found in the recorded data. The method thus allows a reliable selection to be implemented of the time reference in a data-space, with the various connectors of the data-space being capable of successively determining an item of reference time information to be used by the other connectors. Preferably, only the secondary servers that have effectively transmitted an acknowledgement message and the primary server use the transmission time information as a clock.

According to one aspect of the invention, the steps of the method are repeated over a time interval specific to the communication network.

The synchronization method advantageously can be implemented in accordance with a given frequency value. Thus, the primary server can be different in time, thus improving the reliability of determining the time information used for synchronizing the data in the communication network.

According to another aspect of the invention, in the synchronization method, the data item results from solving a cryptographic problem.

The method is even more reliable since it is difficult to determine the data resulting from the execution of a selection algorithm of the primary server so that the server solving the solution of the cryptographic problem can change over time or since the risks associated with a malicious server transmitting time information to other servers are reduced. Since the solution requires computing resources and computation capabilities, the probability that a single communication server solves the algorithm is lower.

According to another aspect of the invention, in the synchronization method, the validation of the synchronization challenge relates to the number of received acknowledgement messages.

Among the plurality of servers present in the communication network, some secondary servers determine that the time information may or may not be used, in accordance with the determination method implemented by the secondary servers. The primary server can, according to one example, compare the number of received acknowledgement messages relative to the number of secondary servers requested in order to validate or not validate the transmission time information and, consecutively, to record the synchronization challenge.

According to another aspect of the invention, in the synchronization method, the validation of a synchronization challenge further comprises the at least one received acknowledgement message.

Recording the received acknowledgement messages allows the servers to be identified that have effectively validated the transmission time information and therefore allows the clock to be determined that is particularly used for timestamping the data transmitted by the servers that transmitted these acknowledgement messages.

According to another aspect of the invention, the synchronization method further comprises recording a reward feature of the primary server if the number of received acknowledgement messages is greater than a trusted threshold.

In order to encourage the communication servers to solve the selection algorithm to be designated the primary server, and to increase the chances of an item of transmission time information being effectively validated, the primary server is rewarded. For example, if a primary server that transmitted time information that is subsequently effectively validated by a sufficient number of secondary servers, then this primary server is rewarded. This reward can be taken into account in the selection algorithm during the next implementations of the method and/or the entity responsible for the server can be compensated as a function of this reward feature. The method relies on the trust and on the participation of the various servers of the plurality of servers. If it is found that the transmission time information is not validated by a sufficient number of secondary servers, i.e., below a trusted threshold of the primary server, then the primary server is penalized. The trusted threshold is possibly taken into account in the process of selecting the primary server from the plurality of servers in order to improve the consensus mechanism for validating the transmission time information.

According to another aspect of the invention, the synchronization method further comprises the prior acquisition of the transmission time information from an external source.

The transmission time information, which is considered to be the reference clock for a period of time before another item of transmission time information is proposed by the same primary server or another primary server selected from among the plurality of servers, is advantageously obtained from a third-party entity.

The various aspects of the synchronization method that have been described above can be implemented independently of one another or in combination with one another.

The invention also relates to a method for determining a time reference used for timestamping data exchanged between a plurality of communication servers of a communication network, said plurality of servers comprising a primary server capable of transmitting an item of transmission time information and at least one secondary server, said method being implemented by the at least one secondary server, and comprising:

receiving, from the primary server, an initialization message comprising an identifier of the primary server, a data item resulting from the execution of an algorithm for selecting the primary server from among the servers of the plurality of servers, an item of transmission time information of the initialization message;

determining a deviation between an item of reception time information computed from the received transmission time information and a local clock of the at least one secondary server;

transmitting an acknowledgement message for the received initialization message as a function of the determined deviation.

A secondary server intervenes in the synchronization method by itself being able to become a primary server and also by analyzing the received temporal analysis relative to a clock, which can be an internal clock or a clock received from a third-party server. Thus, depending on the difference between the computed value and the value of the clock, it may or may not transmit an acknowledgement message and thus may or may not validate the received time information.

According to another aspect of the invention, in the determination method, the reception time information is computed as a function of the data propagation time between the primary server and the at least one secondary server.

The computation can advantageously involve adding the propagation time of the data between the primary server and the secondary server to the received time information, and determining the deviation then involves subtracting a clock value from the computed value. Depending on this deviation and the tolerance acceptable by the secondary server, said secondary server may or may not transmit an acknowledgement message.

According to another aspect of the invention, the determination method further comprises comparing the deviation with a tolerance value, and updating the local clock with the received transmission time information if the deviation is below the tolerance value.

A secondary server can have its own tolerance with respect to the received transmission time information and if said information proves to differ too much from its local clock, i.e., the difference between the transmission time information and the local clock is too great, then the secondary server can consider the received time information to be invalid. Depending on the number of received acknowledgements, a new primary server can be elected by executing a new selection algorithm.

The various aspects of the determination method that have been described above can be implemented independently of one another or in combination with one another. The invention also relates to a device for synchronizing a plurality of communication servers of a communication network, capable of exchanging timestamped data using a time reference, comprising:

a transmitter capable of transmitting an initialization message to the other communication servers, called secondary servers, of the plurality of servers, said initialization message comprising an identifier of the primary server, a data item resulting from the execution of an algorithm for selecting the primary server from among the servers of the plurality of servers, an item of transmission time information of the initialization message;

a receiver capable of receiving, from at least one secondary server, a message acknowledging the transmitted initialization message;

a recorder capable of validating a synchronization challenge comprising the difference between a recorded transmission time reference and the transmission time information of the initialization message, the transmission time information replacing the recorded time reference for timestamping the data exchanged between the servers of the plurality of servers after the validation.

This device, which in all its embodiments is capable of implementing the synchronization method described above, is intended to be implemented in a data server, for example, instantiated in a virtual machine or a container and/or in a cloud environment of a data network.

The invention also relates to a device for determining a time reference used for timestamping data exchanged between a plurality of communication servers of a communication network, said plurality comprising a primary server capable of transmitting an item of transmission time information and at least one secondary server, said device comprising:

a receiver capable of receiving, from the primary server, an initialization message comprising an identifier of the primary server, a data item resulting from the execution of an algorithm for selecting the primary server from among the servers of the plurality of servers, an item of transmission time information of the initialization message;

a determination module capable of determining a deviation between an item of reception time information computed from the received transmission time information and a local clock of the at least one secondary server;

a transmitter capable of transmitting an acknowledgement message for the received initialization message as a function of the determined deviation.

This device, which in all its embodiments is capable of implementing the determination method that has been described above, is intended to be implemented in a data server, for example, instantiated in a virtual machine or a container and/or in a cloud environment of a data network.

The invention also relates to a system for synchronizing a plurality of communication servers of a communication network, capable of exchanging timestamped data using a time reference, said system comprising:

a primary server comprising a synchronization device;

at least one secondary server comprising a determination device.

The invention also relates to a computer program comprising instructions for implementing the steps of the synchronization method that has been described above, when this program is executed by a processor and a recording medium that can be read by a synchronization device on which the computer program is recorded.

The invention also relates to a computer program comprising instructions for implementing the steps of the determination method that has been described above, when this program is executed by a processor and a recording medium that can be read by a determination device on which the computer program is recorded.

These programs can use any programming language, and can be in the form of source code, object code, or intermediate code between source code and object code, such as in a partially compiled format, or in any other desirable format.

The invention also relates to a computer-readable information medium, and comprising instructions of the computer programs as mentioned above.

The information medium can be any entity or device capable of storing the programs. For example, the medium can comprise a storage means, such as a ROM, for example, a CD-ROM or a microelectronic circuit ROM, or even a magnetic recording means, for example, on a hard disk.

Furthermore, the information medium can be a transmissible medium such as an electrical or optical signal, which can be routed via an electrical or optical cable, by radio or by other means. The programs according to the invention particularly can be downloaded over an Internet type network.

Alternatively, the information medium can be an integrated circuit, in which the programs are incorporated, with the circuit being adapted to execute or to be used to execute the methods in question.

4. BRIEF DESCRIPTION OF THE DRAWINGS

Further features and advantages of the invention will become more clearly apparent upon reading the following description of particular embodiments, which are provided by way of simple illustrative and non-limiting examples, and from the accompanying drawings, in which.

5. DESCRIPTION OF THE EMBODIMENTS

Throughout the remainder of the description, embodiments of the invention are presented in a communication infrastructure. This infrastructure can be implemented to route communication data intended for fixed or mobile terminals and the invention can be intended to install virtual functions used for routing and/or processing residential or company customer data.

Figure 1:
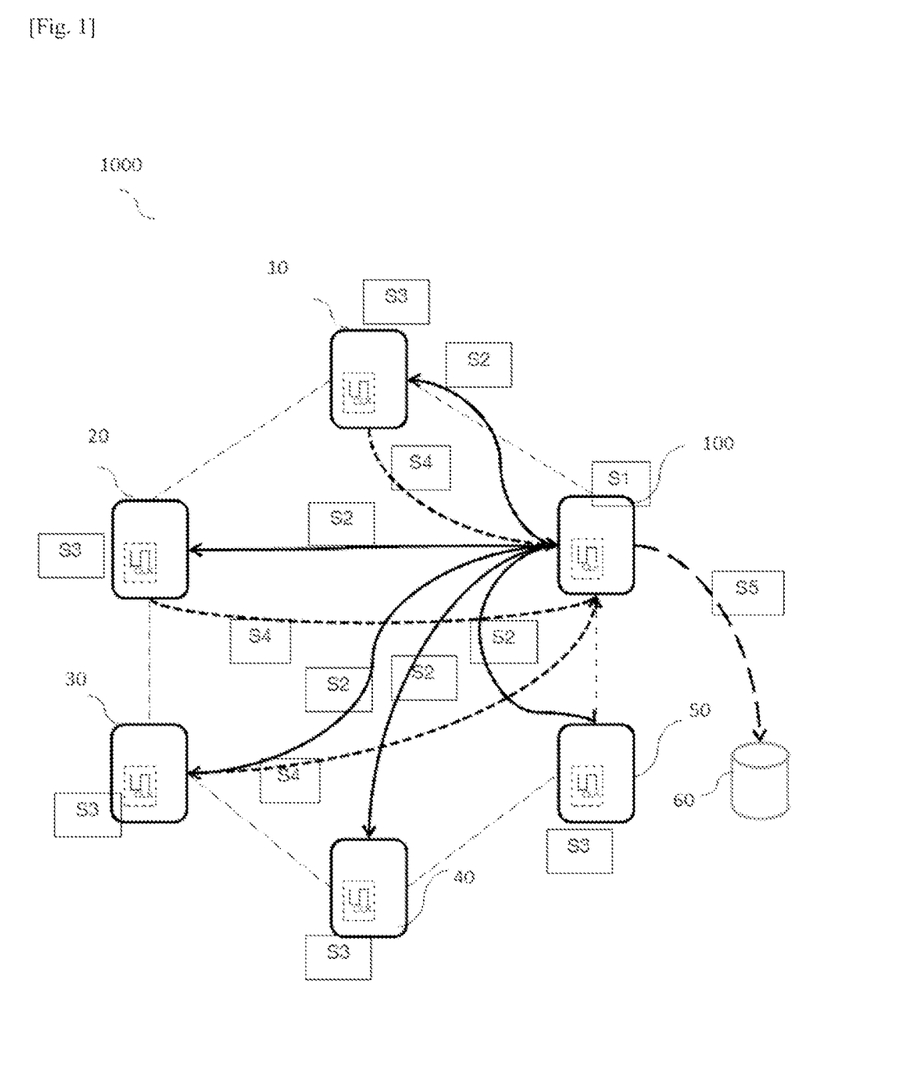
FIG. 1 shows a simplified view of a communication infrastructure comprising a virtual data-space in which a synchronization method and a determination method are implemented.

Firstly, reference is made to [FIG. 1], which shows a simplified view of a communication infrastructure comprising a virtual data-space, in which a synchronization method and a determination method are implemented.

In this [FIG. 1], a set of connectors 10, 20, 30, 40, 50, 100, also called communication servers, are interconnected and exchange data in a virtual data-space 1000 (data-space). The number of connectors is not limited and also can be less than the number shown in [FIG. 1] by way of an example. The virtual data-space 1000 allows a set of participants (businesses, network operators, cloud space operators, etc.) to securely exchange data for the purpose of providing a client with a service. Each communication server manages its data and decides which data it wants to share with the other participants participating in the virtual data-space 1000. The virtual data-space 1000 is deployed on a fixed and/or mobile communication infrastructure allowing the various servers 10, 20, 30, 40, 50, 100 to be able to exchange data. Exchanging data between the communication servers 10, 20, 30, 40, 50, 100 requires that the servers use the same clock to timestamp the data exchanged between these servers. During a first step, the various communication servers 10, 20, 30, 40, 50, 100 of the virtual data-space 1000 complete a consensus loop intended to elect a server, called primary server, from among the communication servers 10, 20, 30, 40, 50, 100. It should be noted that it is possible for only some of the communication servers 10, 20, 30, 40, 50, 100 to complete the consensus loop. This consensus loop corresponds, according to this embodiment, to the execution of an algorithm for selecting a server from among the communication servers 10, 20, 30, 40, 50, 100 of the data-space 1000. According to one example, it involves, for example, for each communication server 10, 20, 30, 40, 50, 100, solving a cryptographic problem involving, for example, finding a value called "nonce" or a numerical value that must resolve an equation or an inequation. According to one example, the primary server will be the server from among the servers 10, 20, 30, 40, 50, 100 that first solved the selection algorithm from among the communication servers 10, 20, 30, 40, 50, 100 and which is therefore capable of transmitting a data item resulting from the execution of the selection algorithm to the other servers. According to this embodiment, the communication server 100 is the first server to solve the selection algorithm and therefore transmits the data item resulting from the execution of the algorithm to the other servers 10, 20, 30, 40, 50 of the data-space. The resulting data item can be, for example, the "nonce" value or even the numerical value indicated above. It should be noted that sending the data resulting from the execution of the selection algorithm has the advantage, in addition to notifying the servers 10, 20, 30, 40, 50 that a master clock will be proposed, of improving the security level of the data-space by ensuring that the server 100 has indeed implemented the selection algorithm. The servers 10, 20, 30, 40, 50 can indeed verify the received data and ensure that it definitely results from the algorithm that these servers will themselves have implemented. Sending this data therefore prevents a clock from being sent by an unauthorized communication server or by a server that has not solved the selection algorithm. [FIG. 1] shows that only the server 100 executes the step S1 corresponding to the consensus loop, since this step comprises electing the server 100 as the primary server, with this server alone having solved the selection algorithm or even because it was the first to solve the selection algorithm from among the servers of the data-space.

During a step S2, the server 100, called primary server, transmits an initialization message to the servers 10, 20, 30, 40, 50, called secondary servers, with said message comprising an identifier of the server 100, for example, an IP address, an FQDN (Fully Qualified Domain Name) identifier or any other identifier that may or may not be specific to the data-space 1000. According to one example, the frame can be signed by means of the ECDSA (Elliptic Curve Digital Signature Algorithm) protocol, which is also used on the current implementation of Bitcoin. This message also includes the result of the execution of the selection algorithm, described above, as well as an item of transmission time information of the transmitted initialization message. According to one example, this is the information corresponding to the moment when the message is effectively transmitted. According to one example, the server 100 can use a clock recovered from an external source in order to define this time information. According to one example, this time information can be formatted according to the definition of the PTP protocol, thus allowing accuracy of the order of a nanosecond. Table 1, shown below, describes an example of information transmitted in the initialization message transmitted by the server 100. The "Emission Timestamp" corresponds to the transmission time information described above.

TABLE 1

Information transmitted in the initialization message

Emission time information - PTP format (64-bit)
Nonce (result of the selection algorithm) -
32-bit unsigned integer type
Signature (identity of the server 100) -
for example, ECDSA (variable size)

The secondary servers 10, 20, 30, 40, 50 receive these initialization messages comprising the information indicated above. Upon reception of this initialization message, during a step S3, upon reception of this frame, each server 10, 20, 30, 40, 50 will proceed with the verification thereof. The first step of this verification will relate to the signature of the primary server 100, as well as the proof (result of the selection algorithm); with these two fields allowing the validity of the server 100 to be confirmed.

During this step S3, the secondary servers 10, 20, 30, 40, 50 determine a deviation between the transmission time information received in the initialization message and a local clock of the secondary servers 10, 20, 30, 40, 50. The secondary servers 10, 20, 30, 40, 50 can have their own local clock or even recover a clock from a remote server. Then, according to one example, each secondary server 10, 20, 30, 40, 50 that is involved, i.e., having received the initialization message, computes the corrected time, by adding the data propagation delay between the server 100 and the considered secondary server to the transmission time information contained in the initialization message. For example, the server 10 will add the propagation time to the received transmission time information, which propagation time can be obtained, for example, from an ICMP (Internet Control Message Protocol) message. This corrected time will then be compared with the reception time of the initialization message assessed from the local clock of the connector. Thus, the shift between the two times (the corrected time and the effective reception time) must remain within a certain tolerance. The secondary server is thus free to choose the verification of the corrected time, which will be based on its own policy. An overall policy can be implemented within the data-space 1000 in order to harmonize the validation rules for the initialization messages between the secondary servers 10, 20, 30, 40, 50. If the shift, i.e., the deviation between the two times, is less than a tolerance value, specific to the secondary server 10, 20, 30, 40, 50 or to the data-space 1000, then the secondary server 10, 20, 30, 40, 50 transmits an acknowledgement message for the received initialization message during a step S4. In [FIG. 1], only the secondary servers 10, 20, 30 transmit an acknowledgement message during step S4. The other two secondary servers, namely the servers 40, 50, have not sent an acknowledgement message because they have not confirmed the primary server 100, either because they have not decrypted the signature thereof or even because the result of the selection algorithm of the server 100 has not been validated by these servers 40, 50. According to another option, and in an alternative or complementary manner, the difference between the times computed by these servers 40, 50 is greater than a tolerance value and they therefore do not validate the received transmission time information.

According to one option, with the servers 10, 20, 30 transmitting an acknowledgement message for the received initialization message, they update their local clock by using the transmission time information that becomes the clock value for the data exchanges between the servers 100, 10, 20, 30. The other secondary servers, i.e., the servers 40 and 50, do not update their local clock since they do not transmit acknowledgement messages and therefore do not validate the received transmission time information.

According to one example, the received acknowledgement messages are signed by the secondary servers 10, 20, 30 in order to authenticate the validity of the transmitters of these acknowledgement messages.

Upon reception of the acknowledgement messages originating from the secondary servers 10, 20, 30 that validated the received initialization message, the primary server 100 records a synchronization challenge in a data register 60 during a step S5. This synchronization challenge includes a difference between the transmitted transmission time information and the recorded time information. This recorded time information, according to one example, is an item of transmission time information previously transmitted by one of the servers 10, 20, 30, 40, 50, 100 of the data-space 1000. Thus, the transmission time information used by the servers from among the servers 10, 20, 30, 40, 50, 100 of the data-space 1000 is regularly updated in accordance with steps S1, S2, S3, S4, S5 described above and is repeatedly replicated, with the primary server being able to change during these various iterations in accordance with the execution of a selection algorithm that can induce a change of primary server upon each iteration. The recorded synchronization challenge further comprises, according to one example, the transmitted initialization message and possibly the received acknowledgement messages originating from the servers 10, 20, 30. An example of a synchronization challenge is shown in Table 2 below.

TABLE 2

Information transmitted in the synchronization challenge

Emission time information - PTP format (64-bit)
Recorded time information/transmission
time information deviation - 32-bit
signed integer
Nonce (result of the selection algorithm) -
32-bit unsigned integer type
Primary server 100 signature (variable size)
Server 10 signature (acknowledgement) (variable size)
Server 20 signature (acknowledgement) (variable size)
. . .

Updating the transmission time information, which will be used for timestamping the data exchanged from the moment when the challenge will be recorded, relies on the proper participation of all the servers 10, 20, 30, 40, 50 and their ability to return signed acknowledgements. It is therefore preferable for the updating of the clock to be executed in a secure environment. However, it is not guaranteed that all the servers of the virtual data-space 1000 contribute to this update. According to one option, in order for the server 100 to validate this new transmission time information, it can consider the number of acknowledgement messages received from the servers 10, 20, 30, 40, 50. In particular, in order for the transmission time information to be validated, i.e., so that recording the challenge on the data register 60 is accepted, and therefore transmitted to the data register 60, the number of acknowledgements must be above a previously defined threshold (for example, 60% of the servers of the data-space 1000) or a fixed number. For example, in [FIG. 1], with the primary server 100 having received 3 acknowledgements originating from the 5 secondary servers 10, 20, 30, 40, 50 of the data-space 1000, the primary server 100 can validate the transmission time information transmitted in the initialization message and record it in the data register 60, which would not have been the case if it had only received 2 acknowledgement messages, while the minimum rate of received acknowledgements was 60%. In this latter case, the recorded time information would have continued to be used for timestamping the data exchanged in the data-space 1000. The validity of the signatures of the acknowledgements also can be controlled by the primary server 100 when they are received.

According to one option, in the event whereby the number (or the ratio) of received acknowledgement messages (relative to the number of secondary servers of the data-space 1000) is greater than a value (or a ratio), called trusted value, then the primary server 100 obtains a reward and this reward feature (monetary, token) is possibly recorded in the data register 60. This reward thus prompts the servers 10, 20, 30, 40, 50, 100 to take part in the synchronization method. Conversely, in the event whereby the number of received acknowledgement messages is less than the trusted value or if the ratio of the number of received acknowledgement messages:the number of secondary servers in the data-space 1000 is less than a trusted ratio, a penalty can be assigned to the primary server 100.

Figure 2:
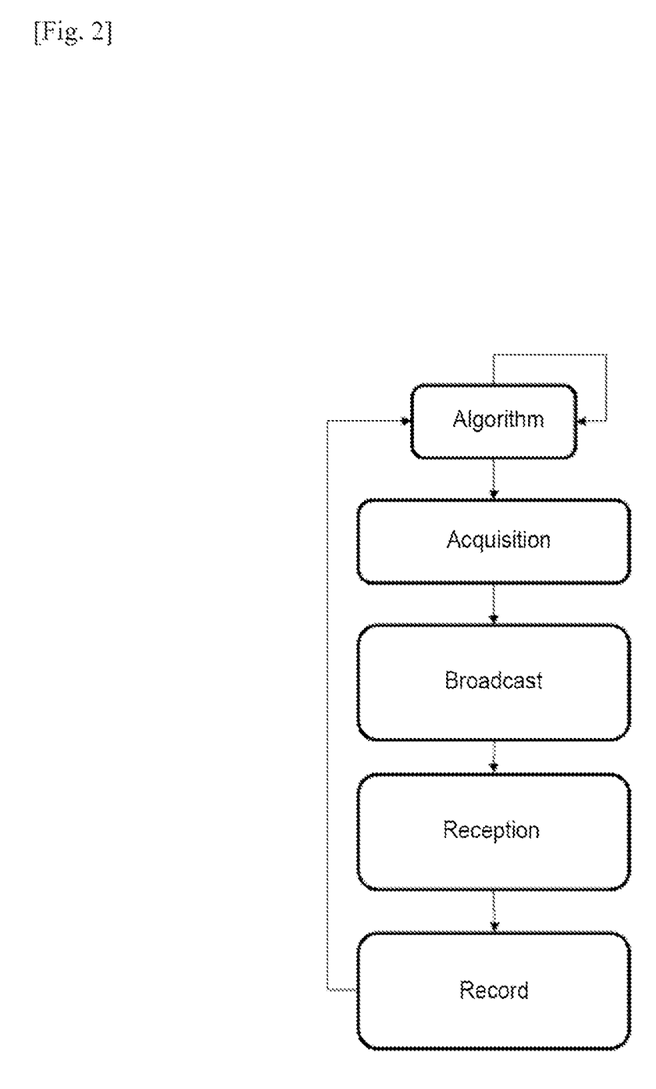
FIG. 2 shows an overview of the synchronization method according to a first embodiment of the invention.

With reference to [FIG. 2], this figure shows an overview of the synchronization method implemented by a primary server (equally called connector) according to a first embodiment of the invention.

The virtual data-space in which a primary server (or connector) and at least one secondary server (or connector) are deployed forms a topology that is static and known to all (for example, they are interconnected via a wired network). Thus, the propagation delays between connectors are constant and known to all. The connectors each have a local clock, potentially synchronized from an external reference (GNSS, time server, mobile network, etc.).

During a first "Algorithm" step, the primary connector executes a selection algorithm. In fact, the primary connector and the at least one secondary connector execute this algorithm but only one will be selected in order to become a primary connector. Each connector thus integrates an application that is certified, for example, by a regulating entity, allowing multiple participant synchronization of the connectors. The application first integrates a consensus loop (selection algorithm) executed by all, regularly allowing a primary connector to be algorithmically selected. This consensus loop will involve cryptographic mechanisms allowing the process of selecting the primary connector to be equitable between the connectors, while preventing Byzantine or Denial of Service type attacks. The use of such a mechanism makes the architecture resilient. Indeed, any connector has chances of being elected. The mechanism is thus designed so that if a connector sends an incorrect synchronization frame, this frame simply could be ignored by the others, since another primary connector will be selected by consensus.

Once the primary connector has been selected, during an "Acquisition" step, said connector acquires a clock, for example, from the local clock indicated above. This acquisition step is considered to be optional since the connector can receive a clock irrespective of whether or not it becomes a primary connector.

During a "Broadcasting" step, the connector elected as primary connector broadcasts a synchronization frame (also called initialization message) to the at least one secondary server of the data-space 1000. This frame particularly includes the clock acquired by the primary connector during the "Acquisition" step. This clock is intended to become the time reference of the data-space until a new time reference is selected. Thus, it is possible to select a "primary connector" at regular intervals that is responsible for giving a time reference to the data-space, by means of a synchronization frame including this time reference, or clock, or transmission time information.

During a "Reception" step, the primary connector receives the acknowledgements from the at least one secondary connector that effectively accepted and validated the time reference received from the primary connector. The number of received acknowledgement messages notifies the primary connector of the level of acceptance of the time reference in the data-space.

The primary connector, once it has collected the acknowledgements thus broadcast, records, during a "Recording" step, the result of the synchronization process implemented in a trusted register, by means of a transaction. This transaction will contain the complete synchronization frame, possibly the collected acknowledgements, as well as the time difference between the old and the new time reference of the data-space, which can be encoded on a signed 32-bit integer.

Figure 3:
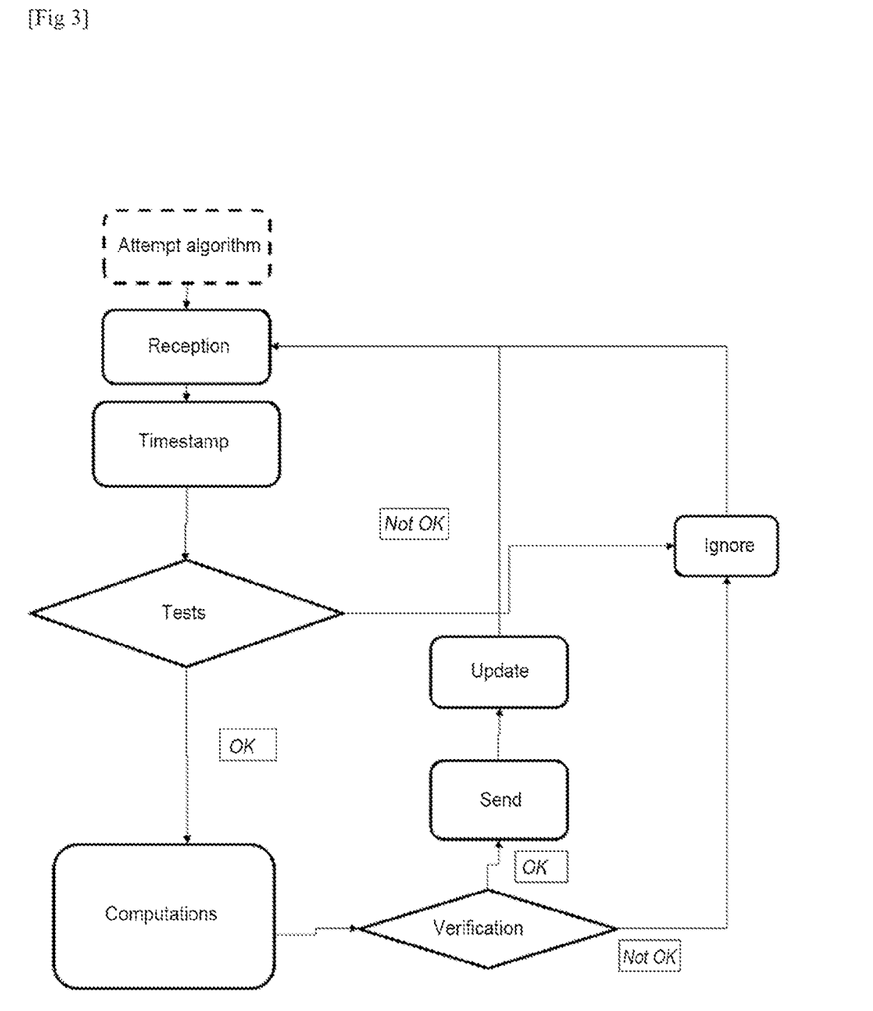
FIG. 3 shows a method for determining an item of time information used for timestamping data exchanged between a plurality of communication servers of a communication network according to a second embodiment of the invention.

With reference to [FIG. 3], this figure shows an overview of the method for determining an item of time information used for timestamping data exchanged between a plurality of communication servers of a communication network implemented by a secondary server (equally called a connector) according to a first embodiment of the invention. A secondary connector can optionally attempt, during an "Algorithm attempt" step, to solve the selection algorithm allowing the primary connector to be connected. This step is optional because a server is not obliged to attempt to solve the algorithm and, whether or not it attempts to solve the algorithm, a connector is referred to as a secondary connector due to the fact that it has not succeeded in solving the algorithm, by failing to attempt to solve it or after failing to solve it, or even because it is not the first to solve said algorithm.

During a "Reception" step, a secondary connector of the data-space implemented on a communication network receives a synchronization frame from the primary connector comprising the clock proposed by the primary connector, as well as proof of the execution of the consensus loop (corresponding to the selection algorithm) and an identifier of the primary connector, such as a signature.

Upon reception of the synchronization frame, during a "Timestamping" step, the secondary server records the clock transmitted by the primary connector, with this clock being able to be used by the secondary connector if it validates it during a subsequent step.

Before validating this clock, during a "Tests" step, the secondary server ensures that the received synchronization frame effectively originates from the primary connector by checking the identifier included in the synchronization frame and verifying that this has definitely successfully executed the consensus loop. In the event that the test is negative, i.e., that one and/or the other of the items of information is not compliant (the identifier does not correspond to a server of the data-space and/or the data does not result from the execution of the consensus loop), then it ignores, during an "Ignore" step, the received synchronization frame and does not take into account the information present in this frame.

During a "Computations" phase, the secondary connector determines a deviation between the received clock modified to take into account the transmission duration of this local clock in the synchronization frame routed between the primary connector and the secondary connector and a local clock of the secondary server. Thus, if H1 represents the transmission time information or the clock transmitted in the synchronization frame and H2 represents a local clock of the secondary server and the propagation time of the synchronization frame between the primary connector and the secondary connector is T1, then the secondary server computes H1+T1. It should be noted that the secondary server can use another method or another computation to compare H1 and H2. According to an alternative, the secondary server can also consider H2 to be valid by comparing H1 and H2 independently of the propagation time. Next, it compares H2 to H1+T1 during a "Verification" step. If, during this "Verification" step, the secondary connector determines that the absolute value of H2−(H1+T1) is less than a tolerance value, then the secondary server validates the received clock H1 and transmits, during a "Sending" step, an acknowledgement message of the received synchronization frame. If the secondary connector does not take into account T1, it then compares the values of H1 and H2. Preferably, it transmits the acknowledgement in a message, preferably signed, for example, with the ECDSA protocol, with the signature specific to the secondary connector, in accordance with the technical requirements of a virtual data-space. If, during the "Verification" step, the deviation between H2 and (H1+T1) is too great, then the secondary connector ignores the received synchronization frame during an "Ignore" step.

If it validates the received clock, then during an "Update" step it places its own local clock with the clock H1, thus guaranteeing that the data that it will emit and that it will receive from this moment are timestamped with the clock that is effectively proposed by the primary connector. It should be noted that the secondary connector, according to one option, can update its local clock with the clock H1 only once it has received a received confirmation message originating from the primary connector. This particularly allows a new clock to only be used if the primary connector receives enough acknowledgement messages from the secondary servers, thus ensuring that this clock is used by a sufficient number of servers of the data-space.

Figure 4:
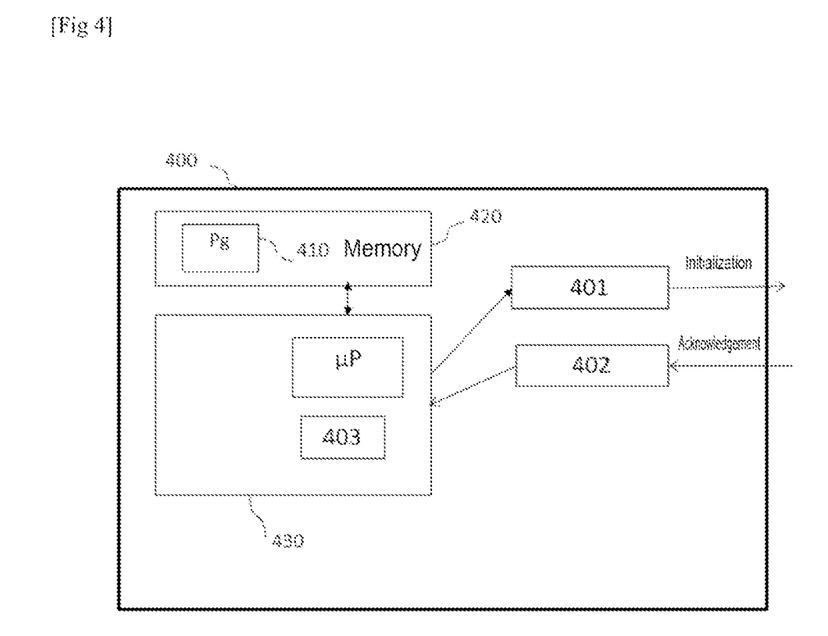
FIG. 4 shows an example of a structure of a synchronization device according to another embodiment of the invention.

With reference to [FIG. 4], this shows an example of a structure of a synchronization device according to another embodiment of the invention.

The synchronization device 400 implements the synchronization method, various embodiments of which have been described above.

Such a device 400 can be implemented in a data server, for example, instantiated in a virtual machine or a container and/or in a cloud environment of a data network.

For example, the device 400 comprises a processing unit 430 that is equipped, for example, with a microprocessor μP and is driven by a computer program 410, stored in a memory 420 and implementing the determination method according to the invention. Upon initialization, the code instructions of the computer program 410 are loaded, for example, into a RAM memory, before being executed by the processor of the processing unit 430.

Such a device 400 comprises:
- a transmitter 401 capable of transmitting an initialization message Init to the other communication servers, called secondary servers, of the plurality of servers, said message comprising an identifier of the primary server, a data item resulting from the execution of a selection algorithm of the primary server from among the servers of the plurality of servers, an item of transmission time information of the initialization message;
- a receiver 402 capable of receiving, from at least one secondary server, an acknowledgement message Ackn of the transmitted initialization message;
- a recorder 403 capable of validating a synchronization challenge comprising the difference between a recorded transmission time reference and the transmission time information of the initialization message, with the transmission time information replacing the recorded time reference for timestamping the data exchanged between the servers of the plurality of servers after the recording.

Figure 5:
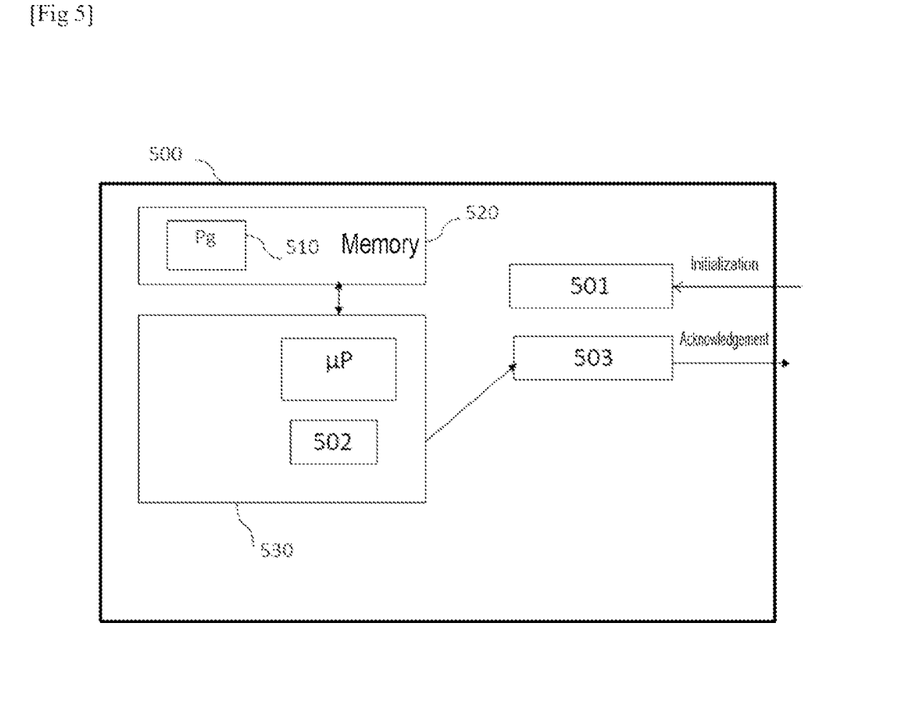
FIG. 5 shows an example of a structure of a device for determining an item of time information used for timestamping data exchanged between a plurality of communication servers of a communication network according to another embodiment of the invention.

With reference to [FIG. 5], this shows an example of a structure of a device for determining a time reference used for timestamping data exchanged between a plurality of communication servers of a communication network according to another embodiment of the invention.

The determination device 500 implements the method for determining an item of time information used for timestamping data exchanged between a plurality of communication servers of a communication network, various embodiments of which have been described above.

Such a device 500 can be implemented in a data server, for example, instantiated in a virtual machine or a container and/or in a cloud environment of a data network.

For example, the device 500 comprises a processing unit 530 that is equipped, for example, with a microprocessor μP and is driven by a computer program 510 that is stored in a memory 520 and implements the charging method according to the invention. Upon initialization, the code instructions of the computer program 510 are loaded, for example, into a RAM memory, before being executed by the processor of the processing unit 530.

Such a device 500 comprises:
- a receiver 501 capable of receiving, from the primary server, an initialization message Init comprising an identifier of the primary server, a data item resulting from the execution of an algorithm for selecting the primary server from among the servers of the plurality of servers, an item of transmission time information of the initialization message;
- a determination module 502 capable of determining a deviation between an item of reception time information computed from the received transmission time information and a local clock of the at least one secondary server;
- a transmitter 503 capable of transmitting an acknowledgement message Ackn for the received initialization message as a function of the determined deviation.

The invention claimed is:

1. A synchronization method for synchronizing a plurality of communication servers of a communication network, the communication servers being capable of exchanging time-stamped data using a time reference, and said method being implemented by a communication server, called a primary server, of the plurality of communication servers and comprising:

transmitting an initialization message to the other communication servers, called secondary servers, of the plurality of communication servers, said initialization message comprising an identifier of the primary server, a data item resulting from execution of an algorithm for selecting the primary server from among the communication servers of the plurality of communication servers, and an item of transmission time information of the initialization message;

receiving, from at least one secondary server, an acknowledgement message for the transmitted initialization message; and validating a synchronization challenge comprising a difference between a recorded transmission time reference and the item of transmission time information of the initialization message, the item of transmission time information of the initialization message replacing the recorded transmission time reference for timestamping the data exchanged between the communication servers of the plurality of communication servers after the validation.

2. The synchronization method as claimed in claim 1, comprising repeating the transmitting, receiving and validating over a time interval specific to the communication network.

3. The synchronization method as claimed in claim 1, wherein the data item results from solving a cryptographic problem.

4. The synchronization method as claimed in claim 1, wherein the validation of the synchronization challenge relates to a number of received acknowledgement messages.

5. The synchronization method as claimed in claim 1, wherein the validation of a synchronization challenge further comprises the at least one received acknowledgement message.

6. The synchronization method as claimed in claim 1, further comprising recording a reward feature of the primary server if a number of received acknowledgement messages is greater than a trusted threshold.

7. The synchronization method as claimed in claim 1, further comprising acquiring the item of transmission time information from an external source prior to the transmitting, receiving and validating.

8. A determination method for determining a time reference used for timestamping data exchanged between a plurality of communication servers of a communication network, said plurality of communication servers comprising a primary server capable of transmitting an item of transmission time information and at least one secondary server, said method being implemented by the at least one secondary server and comprising:

receiving, from the primary server, an initialization message comprising an identifier of the primary server, a data item resulting from execution of an algorithm for selecting the primary server from among the communication servers of the plurality of communication servers, an item of transmission time information of the initialization message;

determining a deviation between an item of reception time information computed from the received item of transmission time information and a local clock of the at least one secondary server; and transmitting, to the primary server, an acknowledgement message for the received initialization message as a function of the determined deviation.

9. The determination method as claimed in claim 8, wherein the reception time information is computed as a function of a data propagation time between the primary server and the at least one secondary server.

10. The determination method as claimed in claim 8, further comprising comparing the deviation with a tolerance value and updating the local clock with the received item of transmission time information if the deviation is below the tolerance value.

11. A device for synchronizing a plurality of communication servers of a communication network, capable of exchanging timestamped data using a time reference, comprising:

a receiver;

a transmitter;

a processor; and a non-transitory computer readable medium comprising instructions stored thereon which when executed by the processor configure the device to:

transmit with the transmitter an initialization message to the other communication servers, called secondary servers, of the plurality of communication servers, said initialization message comprising an identifier of the a primary server, a data item resulting from execution of an algorithm for selecting the primary server from among the communication servers of the plurality of communication servers, and an item of transmission time information of the initialization message;

receive with the receiver, from at least one secondary server, an acknowledgement message for the transmitted initialization message; and validate a synchronization challenge comprising a difference between a recorded transmission time reference and the item of transmission time information of the initialization message, the item of transmission time information of the initialization message replacing the recorded transmission time reference for timestamping the data exchanged between the communication servers of the plurality of communication servers after the validation.

12. A device for determining a time reference used for timestamping data exchanged between a plurality of communication servers of a communication network, said plurality comprising a primary server capable of transmitting an item of transmission time information and at least one secondary server, said device comprising:

a receiver;

a transmitter;

a processor; and a non-transitory computer readable medium comprising instructions stored thereon which when executed by the processor configure the device to:

receive with the receiver, from the primary server, an initialization message comprising an identifier of the primary server, a data item resulting from execution of an algorithm for selecting the primary server from among the communication servers of the plurality of communication servers, an item of transmission time information of the initialization message;

determine a deviation between an item of reception time information computed from the received item of transmission time information and a local clock of the at least one secondary server; and transmit with the transmitter an acknowledgement message for the received initialization message as a function of the determined deviation.

13. A non-transitory computer readable medium comprising a computer program stored thereon comprising instructions for implementing a synchronization method for synchronizing a plurality of communication servers of a communication network when the program is executed by a processor of a communication server, called a primary server, of the plurality of communication servers, the communication servers being capable of exchanging time-stamped data using a time reference, and the method comprising:
- transmitting an initialization message to the other communication servers, called secondary servers, of the plurality of communication servers, said initialization message comprising an identifier of the primary server, a data item resulting from execution of an algorithm for selecting the primary server from among the communication servers of the plurality of communication servers, and an item of transmission time information of the initialization message;
- receiving, from at least one secondary server, an acknowledgement message for the transmitted initialization message; and
- validating a synchronization challenge comprising a difference between a recorded transmission time reference and the item of transmission time information of the initialization message, the item of transmission time information of the initialization message replacing the recorded transmission time reference for timestamping the data exchanged between the communication servers of the plurality of communication servers after the validation.

14. A non-transitory computer readable medium comprising a computer program stored thereon comprising instructions for implementing a determination method for determining a time reference used for timestamping data exchanged between a plurality of communication servers of a communication network when the program is executed by a processor of at least one secondary server of a communication network, the communication network comprising a plurality of communication servers, including the at least one secondary server and a primary server capable of transmitting an item of transmission time information, the method comprising:
- receiving, from the primary server, an initialization message comprising an identifier of the primary server, a data item resulting from execution of an algorithm for selecting the primary server from among the communication servers of the plurality of communication servers, an item of transmission time information of the initialization message;
- determining a deviation between an item of reception time information computed from the received item of transmission time information and a local clock of the at least one secondary server; and
- transmitting, to the primary server, an acknowledgement message for the received initialization message as a function of the determined deviation.

* * * * *